United States Patent
Masui et al.

(10) Patent No.: US 8,477,883 B2
(45) Date of Patent: Jul. 2, 2013

(54) MAXIMUM LIKELIHOOD DECODING METHOD, EQUIPMENT, AND RECEIVER

(75) Inventors: Hironari Masui, Yokohama (JP); Takashi Yano, Tokorozawa (JP); Takehiko Kobayashi, Fuchu (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 1054 days.

(21) Appl. No.: 12/192,279

(22) Filed: Aug. 15, 2008

(65) Prior Publication Data

US 2009/0103641 A1 Apr. 23, 2009

(30) Foreign Application Priority Data

Oct. 19, 2007 (JP) ................................ 2007-272329

(51) Int. Cl.
*H04L 27/06* (2006.01)

(52) U.S. Cl.
USPC ........... 375/341; 375/260; 375/262; 375/267; 375/340; 375/347

(58) Field of Classification Search
USPC .................. 375/260, 267, 340, 347, 262, 341
See application file for complete search history.

(56) References Cited

U.S. PATENT DOCUMENTS

| | | | | |
|---|---|---|---|---|
| 2007/0086549 A1* | 4/2007 | Kim et al. | ...................... | 375/347 |
| 2008/0279299 A1* | 11/2008 | Reuven et al. | ................. | 375/267 |
| 2010/0329393 A1* | 12/2010 | Higuchi | ......................... | 375/340 |

FOREIGN PATENT DOCUMENTS

JP 2006-211131 A 8/2006

OTHER PUBLICATIONS

Furuta et al. "Performance Evaluation in Rayleigh Fading Environment using a Prototype MIMO-OFDM Transmission Equipment for a Millimeter-wave Mobile Camera" The Institute of Electronics, Information and Communication Engineers, IEICE Technical Report RCS2005-141, Jan. 2006 pp. 101-106.

* cited by examiner

*Primary Examiner* — Daniel Washburn
*Assistant Examiner* — Eboni Hughes
(74) *Attorney, Agent, or Firm* — Miles & Stockbridge P.C.

(57) ABSTRACT

Provided is a maximum likelihood decoding method of separating and estimating multiple transmitted signals transmitted by multiple transmitter antennas from multiple received signals received by multiple receiver antennas, comprising: a first step of generating a channel matrix based on channel impulse responses corresponding to the received signals; a second step of dividing the generated channel matrix into multiple sub-matrices, of identifying parts of the received signals corresponding to the sub-matrices obtained through the division, and of transforming the sub-matrices obtained through the division, by using inverse matrices of the sub-matrices obtained through the division; a third step of applying QR decomposition to the transformed sub-matrices to obtain triangular matrices, and of transforming the received signals of the parts by using the obtained triangular matrices; and a fourth step of determining one combination candidate for the parts of the transmitted signals corresponding to the transformed received signals.

16 Claims, 10 Drawing Sheets

$C_1 \sim C_4$ : TRANSMISSION SIGNAL REPLICAS

| METHOD (QRM-MLD) | SIGNAL DIVISION COUNT | COMPUTATIONAL COMPLEXITY (COMPLEX MULTIPLIER COUNT) | |
|---|---|---|---|
| | | 4 × 4 ANTENNAS | 6 × 6 ANTENNAS |
| CONVENTIONAL | – | 3253 CALCULATIONS | 6862 CALCULATIONS |
| DIVISION (FIRST CONFIGURATION) | 2 | 1752 CALCULATIONS | 4206 CALCULATIONS |
| | 3 | – | 2706 CALCULATIONS |
| DIVISION (SECOND CONFIGURATION) | 2 | 2040 CALCULATIONS | 4520 CALCULATIONS |
| | 3 | – | 3282 CALCULATIONS |

16QAM, $M = 16$

FIG. 9

$c_1 \sim c_4$ : TRANSMISSION SIGNAL REPLICAS

MAXIMUM LIKELIHOOD DECODING METHOD, EQUIPMENT, AND RECEIVER

CLAIM OF PRIORITY

The present application claims priority from Japanese patent applications JP 2007-272329 filed on Oct. 19, 2007, the content of which is hereby incorporated by reference into this application.

BACKGROUND OF THE INVENTION

This invention relates to a wireless communication method and a wireless communication apparatus for stable high-speed communication by using a plurality of transmission and receiver antennas, and more particularly, to a maximum likelihood decoding process for received signals.

A multiple-input multiple-output (MIMO) system in which wireless communication is performed by using a plurality of transmission and receiver antennas achieves a high transmission rate. However, in order to achieve a high transmission rate, it is necessary to accurately separate and detect interferences of a plurality of transmitted signals mixed in received signals therefrom. A maximum likelihood decoding (MLD) method can be used to obtain the most excellent property, but it cannot be free form large computational complexity because of its complicated process. Therefore, a QRM-MLD process has been proposed as a practical approximation process.

In "Performance Evaluation in Rayleigh Fading Environment using a Prototype MIMO-OFDM Transmission Equipment for a Millimeter-wave Mobile Camera", Hiroyuki Furuta and Tetsuomi Ikeda, pp. 101-106, RCS2005-141, January 2006, Technical Report, Committee on radio communication systems, the Institute of Electronics, Information and Communication Engineers (IEICE) (hereinafter, referred to as "Non-Patent Document 1"), a technology is described in which inverse matrix calculation (zero-forcing) is performed in advance, the number of candidates for one transmitted signal is limited to a given number (for example, four), and all transmitted signals are estimated through the MLD process.

Further, JP 2006-211131 A describes a technology in which, after the inverse matrix calculation, described in Non-Patent Document 1, is performed, the number of candidates for each transmitted signal is set according to the signal-to-noise ratio of each of the transmitted signal, and all transmitted signals are estimated through the MLD process.

Referring to FIGS. 10 and 11, a conventional QRM-MLD process will be described.

FIG. 10 is a configuration diagram of a QRM-MLD process unit that executes the conventional QRM-MLD process.

The QRM-MLD process unit includes a channel estimator 71, a channel matrix generation unit 72, a QR decomposition process unit 73, a signal transform unit 74, and an MLD process unit 75.

The channel estimator 71 estimates a channel impulse response of each propagation channel by using pilot signals.

The channel matrix generation unit 72 generates a channel matrix H having the channel impulse responses estimated by the channel estimator 71, as matrix elements.

The QR decomposition process unit 73 applies QR decomposition to the channel matrix generated by the channel matrix generation unit 72. For example, when the number of transmitter antennas is four and the number of receiver antennas is four, the relationship between transmitted signals T and reception signals is R=HT expressed by the following formula.

Formula 1

$$\begin{bmatrix} r_1 \\ r_2 \\ r_3 \\ r_4 \end{bmatrix} = \begin{bmatrix} h_{11} & h_{12} & h_{13} & h_{14} \\ h_{21} & h_{22} & h_{23} & h_{24} \\ h_{31} & h_{32} & h_{33} & h_{34} \\ h_{41} & h_{42} & h_{43} & h_{44} \end{bmatrix} \begin{bmatrix} t_1 \\ t_2 \\ t_3 \\ t_4 \end{bmatrix} \quad (1)$$

The QR decomposition applied to the channel matrix is H=QH' expressed by the following formula.

Formula 2

$$\begin{bmatrix} h_{11} & h_{12} & h_{13} & h_{14} \\ h_{21} & h_{22} & h_{23} & h_{24} \\ h_{31} & h_{32} & h_{33} & h_{34} \\ h_{41} & h_{42} & h_{43} & h_{44} \end{bmatrix} = \begin{bmatrix} q_{11} & q_{12} & q_{13} & q_{14} \\ q_{21} & q_{22} & q_{23} & q_{24} \\ q_{31} & q_{32} & q_{33} & q_{34} \\ q_{41} & q_{42} & q_{43} & q_{44} \end{bmatrix} \begin{bmatrix} h'_{11} & h'_{12} & h'_{13} & h'_{14} \\ 0 & h'_{22} & h'_{23} & h'_{24} \\ 0 & 0 & h'_{33} & h'_{34} \\ 0 & 0 & 0 & h'_{44} \end{bmatrix} \quad (2)$$

The QR decomposition is a unique matrix transformation. A first matrix Q in the right side of the formula is a unitary matrix (where the matrix multiplication of the first matrix Q and the complex conjugate transposed matrix is equal to an identity matrix). A second matrix H' in the right side of the formula is an upper triangular matrix.

Next, the complex conjugate transposed matrix of the matrix Q is expressed by $Q^*$. When both sides of the formula (1) are multiplied by $Q^*$ from the left hand sides to obtain $Q^*R=Z$ in the left side of the formula, the right side of the formula is $Q^*HT=Q^*(QH')T=H'T$ expressed by the following formula.

Formula 3

$$Q^* \begin{bmatrix} r_1 \\ r_2 \\ r_3 \\ r_4 \end{bmatrix} = \begin{bmatrix} z_1 \\ z_2 \\ z_3 \\ z_4 \end{bmatrix} = \begin{bmatrix} h'_{11} & h'_{12} & h'_{13} & h'_{14} \\ 0 & h'_{22} & h'_{23} & h'_{24} \\ 0 & 0 & h'_{33} & h'_{34} \\ 0 & 0 & 0 & h'_{44} \end{bmatrix} \begin{bmatrix} t_1 \\ t_2 \\ t_3 \\ t_4 \end{bmatrix} \quad (3)$$

The signal transform unit 74 multiplies received signals by the complex conjugate transposed matrix of the unitary matrix, obtained through the QR decomposition, to transform the received signals into new signals. For example, the signal transform unit 74 multiplies a received-signal matrix R by the complex conjugate transposed matrix $Q^*$ to transform the received-signal matrix R to a signal matrix Z, as expressed by the formula (3).

The MLD process unit 75 estimates transmitted signals through an MLD process.

Next, details of the MLD process performed after the QR decomposition will be described. When $t_4$ is focused on in the formula (3), $z_4 = h'_{44} t_4$ is established. When a QPSK system is used for modulation and demodulation, four types of symbol replica candidates for a transmitted signal are obtained corresponding to the number of levels. For each of the symbol candidates, "$h_{44}' t_4$" is calculated and the squared Euclidean distance from $z_4$ is calculated. It is estimated that the symbol candidate having the shortest Euclidean distance, among the calculated Euclidean distances, is most likely to be a proper transmitted signal. Next, when focusing on $t_3$, $z_3 = h_{33}' t_3 + h_{34}' t_4$ is established. Therefore, for each of the combinations (4×4=16 types) of symbol candidates for $t_3$ and $t_4$, "$h_{33}' t_3 + h_{34}' t_4$" is calculated and the squared Euclidean distance from $z_3$ is calculated. The Euclidean distance for each of 16 types of symbol candidates is calculated by combining the squared Euclidean distance from $z_3$ and the squared Euclidean distance from $z_4$. It is estimated that the symbol candidate having the shortest Euclidean distance, among the calculated Euclidean distances, is most likely to be a proper signal. The similar processing is repeated up to $t_1$ in the MLD process. It should be noted that distance calculation is required for 256 (fourth power of four) types of symbol candidates for $t_1$, and in general, when symbols of C levels are sent by N transmitter antennas, the computational complexity as large as the Nth power of C is required. In order to reduce the computational complexity, an M-algorithm is used.

FIG. 11 is an operation diagram of a process of a conventional M-algorithm.

First, four types of symbol replicas $C_1$ to $C_4$ are created as candidates for the transmitted signal $t_4$. A symbol replica is a signal temporarily set in a receiver. Specifically, the symbol replica is a signal assumed to be a received signal based on an estimated channel impulse response.

Next, for each of the four types of symbol replicas $C_1$ to $C_4$, four types of candidates for the transmitted signal $t_3$ are created as symbol replicas, to set 16 types of candidates for the combination of $(t_3, t_4)$. Then, the squared Euclidean distances between each of the set transmitted signal candidates and a transformation signal Z are calculated, and combinations of $(t_3, t_4)$ are narrowed down in an ascending order of the calculated squared Euclidean distances. For example, in a case where M=3 as shown in FIG. 11, combinations of $(t_3, t_4)$ are narrowed down to three candidates.

Next, for the three transmitted signal candidates, obtained by narrowing down the combinations of $(t_3, t_4)$ for the transmitted signal $t_3$, four types of symbol replicas for the transmitted signal $t_2$ are created, to set 12 types of candidates for the combination of $(t_2, t_3, t_4)$. Then the squared Euclidean distances between each of the set transmission signal candidates and a convension signal Z are calculated and combinations of $(t_2, t_3, t_4)$ are narrowed down (M=3) in an ascending order of the calculated squared Euclidean distances.

Finally, for the transmitted signal $t_1$, the process of the M-algorithm is also applied to three transmitted signal candidates obtained by narrowing down combinations of $(t_2, t_3, t_4)$ for the transmitted signal $t_2$, to finally determine the combination of $(t_1, t_2, t_3, t_4)$ having the shortest squared Euclidean distance. In short, when combinations of candidates are narrowed down during the process, an optimum solution may be missed, but an exponential increase in computational complexity can be suppressed.

SUMMARY OF THE INVENTION

With the above-mentioned conventional technologies, multiple candidates for each transmitted signal are individually estimated, and the MLD process is performed by combining multiple candidates for all transmitted signals. Accordingly, when multiple candidates for each transmitted signal are individually estimated, effects of other transmitted signals are not reflected, and hence the quality of an estimation solution tends to deteriorate.

The representative aspects of this invention are as follows. That is, there is provided a maximum likelihood decoding method of separating and estimating multiple transmitted signals transmitted by multiple transmitter antennas from multiple received signals received by multiple receiver antennas, comprising: a first step of generating a channel matrix based on channel impulse responses corresponding to the received signals; a second step of dividing the generated channel matrix into multiple sub-matrices, of identifying parts of the received signals corresponding to the sub-matrices obtained through the division, and of transforming the sub-matrices obtained through the division, by using inverse matrices of the sub-matrices obtained through the division; a third step of applying QR decomposition to the transformed sub-matrices to obtain triangular matrices, and of transforming the received signals of the parts by using the obtained triangular matrices; and a fourth step of determining one combination candidate for the parts of the transmitted signals corresponding to the transformed received signals.

According to an aspect of this invention, the computational complexity can be reduced by performing the MLD process after each channel matrix is divided into sub-matrices. Further, the MLD process is applied to multiple transmitted signals in each sub-matrix to estimate multiple candidates for the transmitted signals, and hence an effect between transmitted signals is reflected in estimation of the other transmitted signals, thereby improving the quality of an estimation solution.

BRIEF DESCRIPTION OF THE DRAWINGS

The present invention can be appreciated by the description which follows in conjunction with the following figures, wherein:

FIG. 9 is an explanatory diagram showing a comparison of a computational complexity between the first and second embodiments of this invention and a conventional technology;

DETAILED DESCRIPTION OF THE PREFERRED EMBODIMENTS

Hereinafter, embodiments of this invention will be described with reference to the accompanying drawings.

First Embodiment

A MIMO communication system according to a first embodiment of this invention will be described.

Figure 1A:
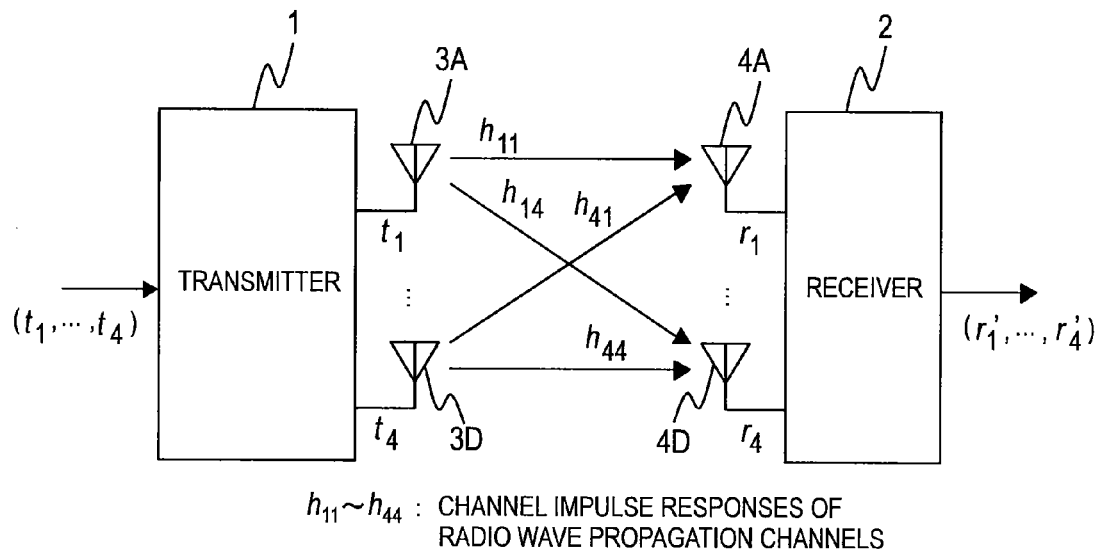
FIG. 1A is a block diagram showing a configuration of a MIMO communication system in accordance with a first embodiment of this invention.

FIG. 1A is a configuration diagram of the MIMO communication system according to the first embodiment of this invention.

The MIMO communication system includes a transmitter 1, a receiver 2, transmitter antennas 3 (3A to 3D), and receiver antennas 4 (4A to 4D). Hereinafter, the transmitter antennas 3A to 3D may be collectively referred to as the transmitter antennas 3. The receiver antennas 4A to 4D may also be collectively referred to as the receiver antennas 4.

The transmitter 1 simultaneously sends transmission data items ($t_1$, $t_2$, $t_3$, $t_4$) in the form of transmitted signals at an identical frequency by using the four different transmitter antennas 3. It should be noted that the transmitted signals are affected by channel impulse responses ($h_{11}$ to $h_{44}$) of propagation channels.

The receiver 2 receives the signals, which have been affected by the channel impulse responses ($h_{11}$ to $h_{44}$), by using the four different receiver antennas 4. Since a plurality of transmission data items are mixed in the received signals, the receiver 2 performs a signal separation process to separate the corresponding mixed transmitted signals from the received signals to obtain estimation signals ($r_1'$, $r_4'$), in other words, estimation solutions for transmitted signals.

It should be noted that the four transmitter antennas 3 and the four receiver antennas 4 are shown in FIG. 1A, but an arbitrary number of different transmitter antennas or receiver antennas may be provided.

Figure 1B:
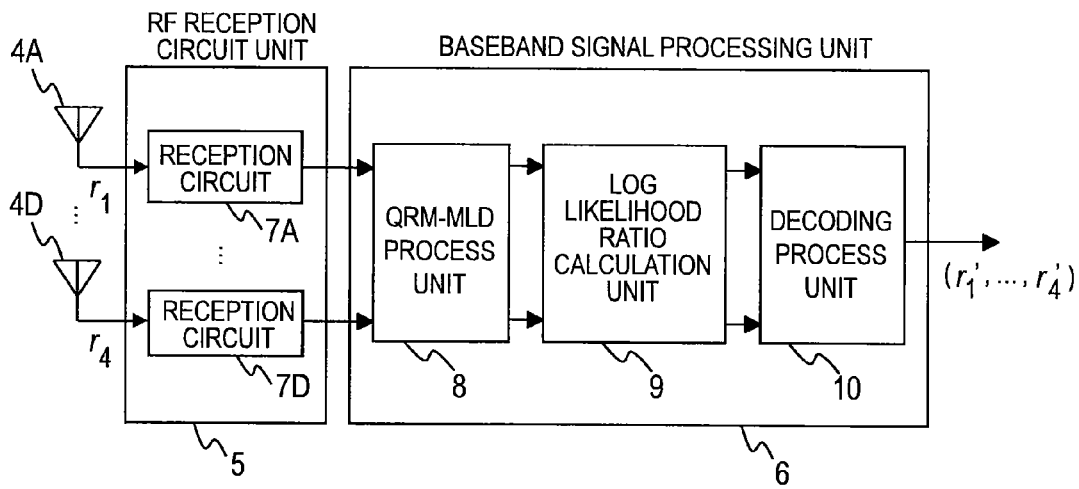
FIG. 1B is a block diagram showing a configuration of a receiver in accordance with the first embodiment of this invention.

FIG. 1B is a configuration diagram of the receiver 2 according to the first embodiment of this invention.

The receiver 2 includes an RF reception circuit unit 5 and a baseband signal processing unit 6.

The RF reception circuit unit 5 includes the same number of reception circuits 7 (7A to 7D) as the number of the receiver antennas 4A to 4D. Hereinafter, the reception circuits 7A to 7D may be collectively referred to as the reception circuits 7. The reception circuits 7 amplify the amplitudes of signals received from the receiver antennas 4 and input the amplified received signals to the baseband signal processing unit 6.

The baseband signal processing unit 6 includes a QRM-MLD process unit 8, a log likelihood ratio calculation unit 9, and a decoding process unit 10.

The QRM-MLD process unit 8 separates interferences of transmitted signals mixed in the received signals therefrom. It should be noted that details of the QRM-MLD process unit 8 will be described later with reference to FIG. 4.

The log likelihood ratio calculation unit 9 calculates the log likelihood of each signal obtained through the separation.

The decoding process unit 10 performs a decoding process (for example, turbo decoding process) based on the calculated log likelihood.

In order to reduce the entire computational complexity, the QRM-MLD process unit 8 of the first embodiment of this invention divides and transforms a channel matrix into multiple sub-matrices, and applies QR decomposition to the sub-matrices, obtained through the transformation. Further, the QRM-MLD process unit 8 performs MLD processes by using triangular matrices obtained through the QR decomposition. At the last stage, results obtained through the respective MLD processes are combined to obtain an estimation solution.

Figure 2:
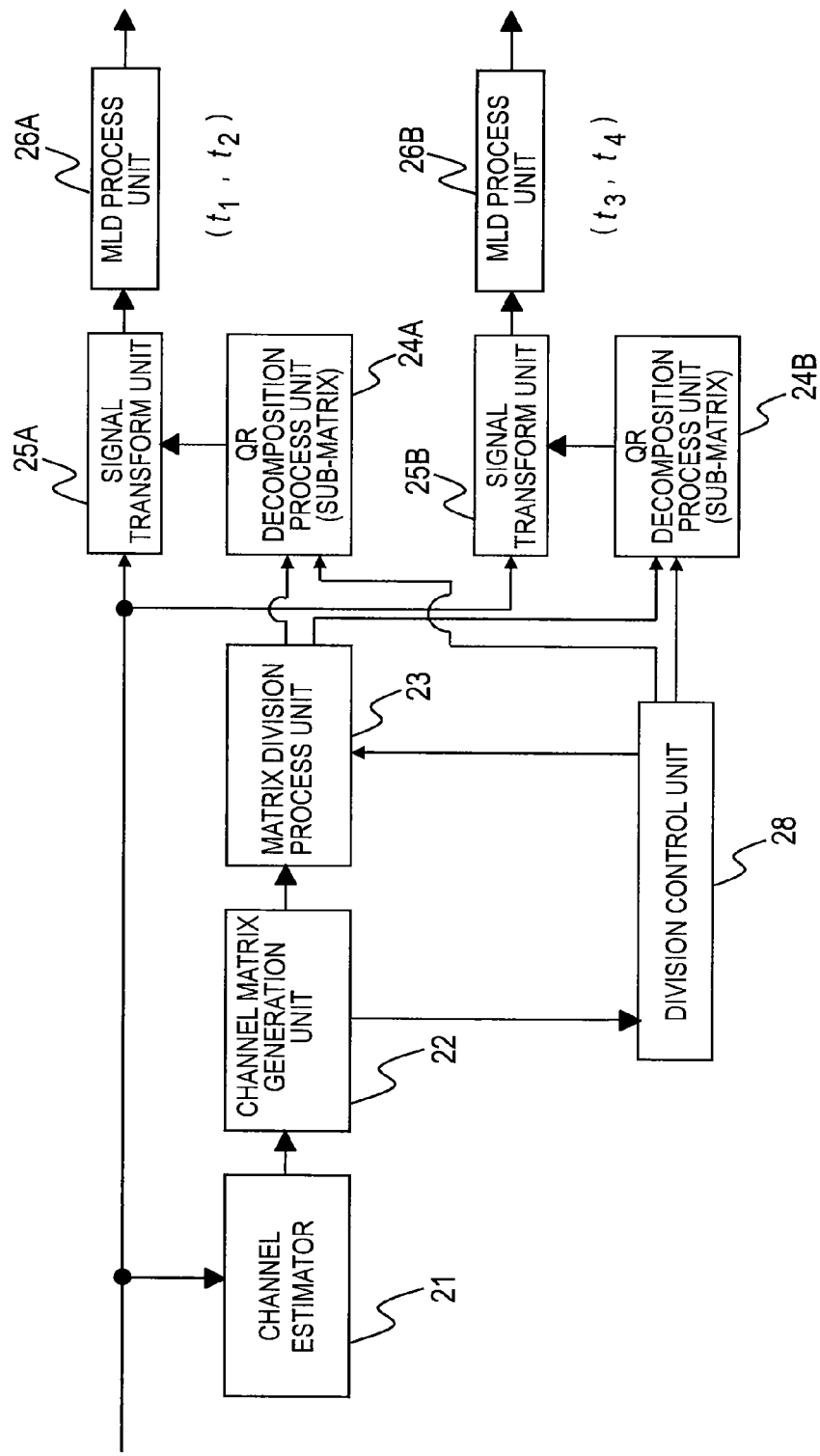
FIG. 2 is a block diagram showing a configuration of a QRM-MLD process unit in accordance with the first embodiment of this invention.

The above-mentioned process is called a division QRM-MLD process. FIG. 2 shows a configuration of the QRM-MLD process unit 8 when the signal division number is two. It should be noted that the signal division number is the number by which transmission and reception signals are divided corresponding to the division of the channel matrix.

FIG. 2 shows the configuration diagram of the QRM-MLD process unit 8 according to the first embodiment of this invention.

The QRM-MLD process unit 8 includes a channel estimator 21, a channel matrix generation unit 22, a matrix division process unit 23, QR decomposition process units 24 (24A and 24B), signal transform units 25 (25A and 25B), MLD process units 26 (26A and 26B), and a division control unit 28. Hereinafter, the QR decomposition process units 24A and 24B may be collectively referred to as the QR decomposition process units 24. The signal transform units 25A and 25B may also be collectively referred to as the signal transform units 25. The MLD process units 26A and 26B may also be collectively referred to as the MLD process units 26.

The channel estimator 21 estimates a channel impulse response of each propagation channel by using a known pilot signal.

The channel matrix generation unit 22 generates a channel matrix having the channel impulse responses estimated by the channel estimator 21, as matrix elements.

The matrix division process unit 23 divides and transforms the channel matrix generated by the channel matrix generation unit 22 into sub-matrices.

For example, the matrix division process unit 23 divides a 4×4 channel matrix shown in the right side of the formula (1) into four 2×2 sub-matrices shown in formulae (4) to (7).

Formula 4
$$H_{11} = \begin{bmatrix} h_{11} & h_{12} \\ h_{21} & h_{22} \end{bmatrix} \quad (4)$$

Formula 5
$$H_{12} = \begin{bmatrix} h_{13} & h_{14} \\ h_{23} & h_{24} \end{bmatrix} \quad (5)$$

Formula 6
$$H_{21} = \begin{bmatrix} h_{31} & h_{32} \\ h_{41} & h_{42} \end{bmatrix} \quad (6)$$

Formula 7
$$H_{22} = \begin{bmatrix} h_{33} & h_{34} \\ h_{43} & h_{44} \end{bmatrix} \quad (7)$$

With the use of the four sub-matrices, four transmitted signals and four received signals expressed in the formula (1) are divided into two formulae (8) and (9), the number of formulae used being as the signal division number.

Formula 8
$$\begin{bmatrix} r_1 \\ r_2 \end{bmatrix} = H_{11} \begin{bmatrix} t_1 \\ t_2 \end{bmatrix} + H_{12} \begin{bmatrix} t_3 \\ t_4 \end{bmatrix} \quad (8)$$

Formula 9
$$\begin{bmatrix} r_3 \\ r_4 \end{bmatrix} = H_{21} \begin{bmatrix} t_1 \\ t_2 \end{bmatrix} + H_{22} \begin{bmatrix} t_3 \\ t_4 \end{bmatrix} \quad (9)$$

Further, the formulae (8) and (9) are transformed with respect to the transmitted signals ($t_1$, $t_2$) to obtain a formula (10). Further, the formulae (8) and (9) are transformed with respect to the transmitted signals ($t_3$, $t_4$) to obtain a formula (11).

Formula 10

$$H_{12}^{-1}\begin{bmatrix}r_1\\r_2\end{bmatrix} - H_{22}^{-1}\begin{bmatrix}r_3\\r_4\end{bmatrix} = \begin{bmatrix}y_1\\y_2\end{bmatrix} = (H_{12}^{-1}\ H_{11}\ -H_{22}^{-1}\ H_{21})\begin{bmatrix}t_1\\t_2\end{bmatrix} \quad (10)$$

Formula 11

$$H_{11}^{-1}\begin{bmatrix}r_1\\r_2\end{bmatrix} - H_{21}^{-1}\begin{bmatrix}r_3\\r_4\end{bmatrix} = \begin{bmatrix}y_3\\y_4\end{bmatrix} = (H_{11}^{-1}\ H_{12}\ -H_{21}^{-1}\ H_{22})\begin{bmatrix}t_3\\t_4\end{bmatrix} \quad (11)$$

In the formulae (10) and (11), $H^{-1}$ represents the inverse matrix of a matrix H.

As described above, the transmitted signals ($t_1$, $t_2$, $t_3$, $t_4$) are divided into two groups as shown in the formulae (10) and (11).

It should be noted that a channel matrix is divided into sub-matrices by a division number which can exactly divide both of the number of rows and the number of columns of the channel matrix (by a common factor of the number of rows and the number of columns of the channel matrix). Accordingly, the sizes of the sub-matrices, obtained through the division, become equal, minimizing the time required for parallel computation processing. Further, a channel matrix may be divided into sub-matrices each having the smallest size (in other words, into the largest number of sub-matrices). In a case of a matrix having a size of n rows by n columns, for example, about the computational complexity corresponding to the cubic of n is required for QR decomposition applied to the matrices, obtained through division, to be described later. For example, when the channel matrix is divided into four matrices each having a size of (n/2) rows by (n/2) columns, the number of matrices is increased by four times, but the computational complexity required for each matrix is reduced by (½)^3=⅛. As a result, the entire computational complexity is reduced even when a sequential computation process is performed. In short, as the size of a sub-matrix is made smaller, the computational complexity is reduced more.

The QR decomposition process units 24 apply QR decomposition to each of the sub-matrices obtained through the division in the matrix division process unit 23. The sub-matrices are put in round brackets in the right sides of the formulae (10) and (11).

The signal transform units 25 each multiply the received signals by the complex conjugate transposed matrix of a unitary matrix obtained through the QR decomposition, to transform the received signals into new signals.

The MLD process unit 26A estimates a combination of transmitted signals ($t_1$, $t_2$) obtained through the division, and the MLD process unit 26B estimates a combination of transmitted signals ($t_3$, $t_4$) obtained through the division.

The division control unit 28 controls channel-matrix division based on the channel matrix generated by the channel matrix generation unit 22. For example, the division control unit 28 determines a channel-matrix division number (signal division number) depending on the number of transmitter and receiver antennas, and instructs the matrix division process unit 23 to divide the channel matrix by the determined division number. Further, the division control unit 28 instructs multiple (the same number as the number of operating QR decomposition process units 24) QR decomposition process units 24 to apply QR decomposition to each of the sub-matrices obtained through the division according to the determined division number in the matrix division process unit 23.

Figure 3:
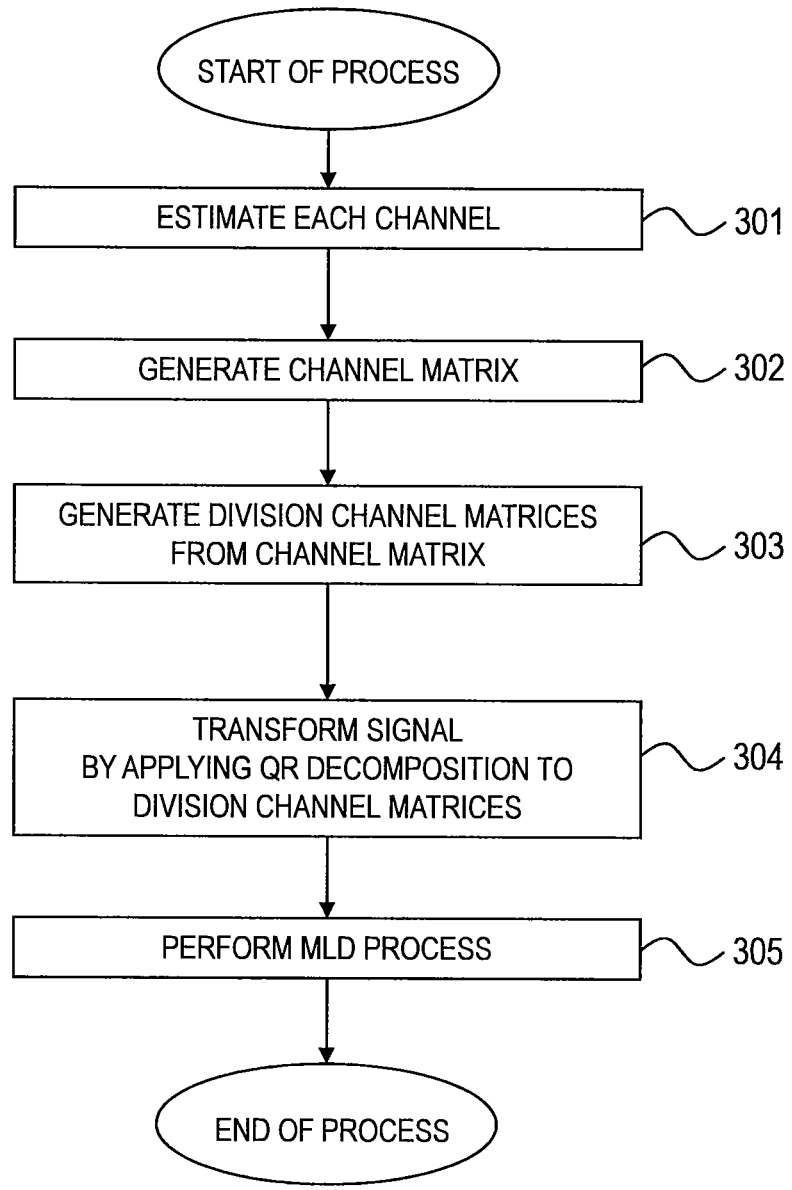
FIG. 3 is a flowchart showing a division QRM-MLD process in accordance with the first embodiment of this invention.

FIG. 3 is a flowchart of the division QRM-MLD process according to the first embodiment of this invention.

The division QRM-MLD process is started when received signals are input to the QRM-MLD process unit 8.

First, the channel estimator 21 estimates channel impulse responses of propagation channels used between the transmitter antennas 3 and the receiver antennas 4 (301). Specifically, the channel estimator 21 estimates the channel impulse responses of the propagation channels by using known pilot signals.

Next, the channel matrix generation unit 22 generates a channel matrix by using the channel impulse responses estimated in the step 301 (302).

Next, the matrix division process unit 23 generates division channel matrices from the channel matrix generated in the step 302 (303). A specific process to generate the division channel matrices will be described later with reference to FIG. 4. It should be noted that, when the number of transmitter antennas differs from the number of receiver antennas, the generated channel matrix is not square and it is generally difficult to calculate the inverse matrices shown in the formulae (10) and (11). How to avoid this difficulty will be described later.

Next, the QR decomposition process units 24 apply QR decomposition to each of the division channel matrices generated in the step 303. The signal transform units 25 transform the received signals based on the division channel matrices to which the QR decomposition has been applied (304). Specifically, the QR decomposition process units 24 apply QR decomposition to each of the division channel matrices generated in the step 303 to obtain the complex conjugate transposed matrices of unitary matrices, and triangular matrices. Then, the signal transform units 25 each multiply the received signals by corresponding one of the obtained complex conjugate transposed matrices of the unitary matrices, to transform the received signals into new signals.

Next, the MLD process units 26 apply the MLD process to the new signals obtained through the signal transform in the step 304, to estimate transmitted signals (305).

Specifically, the MLD process units 26 apply the MLD process to the new signals obtained through the signal transform in the step 304, to estimate candidates for the transmitted signals. To estimate candidates for the transmitted signals ($t_1$, $t_2$), one combination candidate is determined, for example, which has the shortest Euclidean distance between symbol replicas of the transmitted signals, set in the MLD process, and the new signals obtained through the signal transform in the step 304. To estimate candidates for the transmitted signals ($t_3$, $t_4$), one combination candidate is determined in the same manner. Then, the transmitted signals ($t_1$, $t_2$, $t_3$, $t_4$) are determined as estimation values.

Next, a description will be given of an inverse-matrix calculation method used when the channel matrix generated in the step 302 is not square because the number of transmitter antennas differs from the number of receiver antennas.

In order to handle the non-square channel matrix, a generalized inverse matrix is calculated based on a formula (12), in which a square channel matrix is generated and then the inverse matrix is calculated. In the formula (12), $H^+$ represents the generalized inverse matrix of a matrix H (corresponding to the inverse matrix $H^{-1}$ of a square matrix), $\sigma_n$ represents a noise component, and I represents an identity matrix. The generalized-inverse-matrix calculation includes the addition of $\sigma_n^2 I$ in the right side of the formula (12), and hence it is possible to avoid the difficulty of an inverse matrix calculation when the diagonal elements of the matrix have values close to 0.

Formula 12

$$H^+ = (H^*H + \sigma_n^2 I)^{-1} H^* \quad (12)$$

Figure 4:
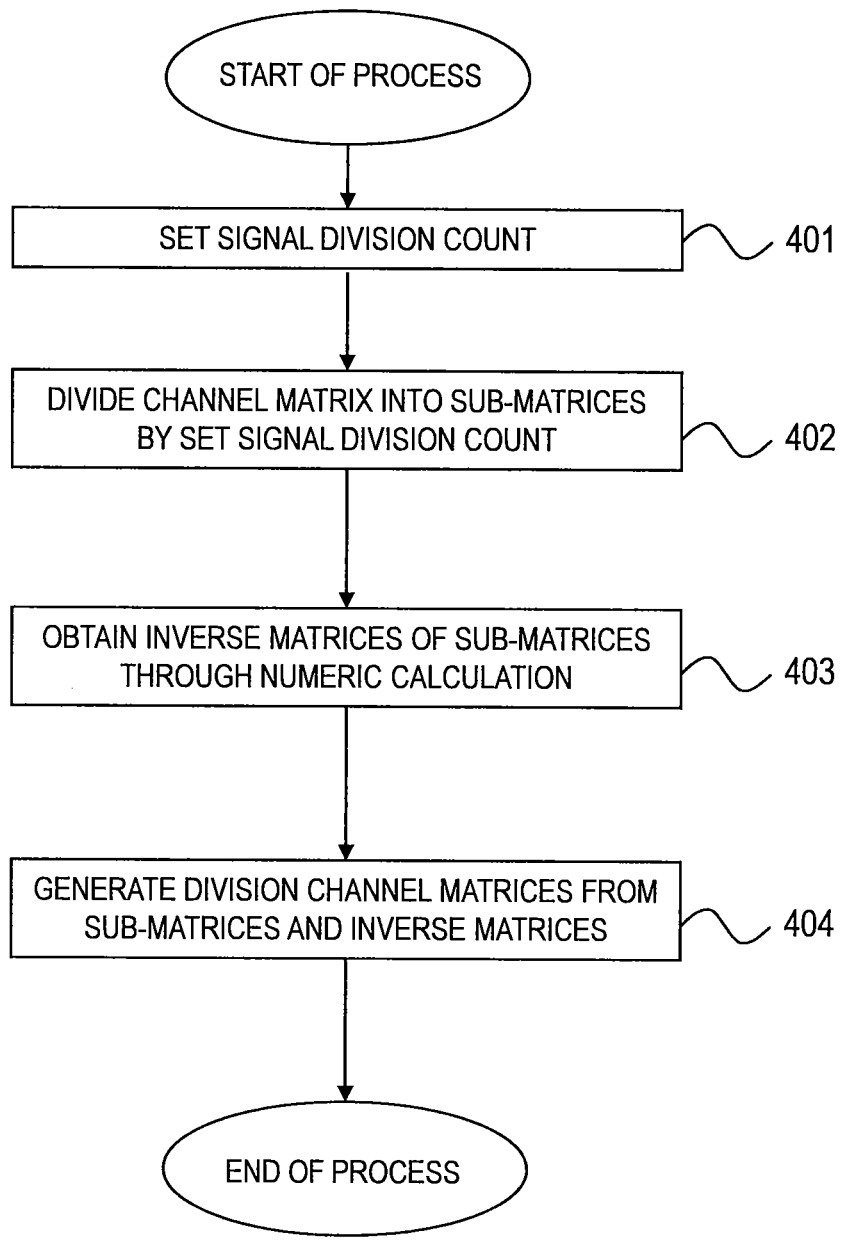
FIG. 4 is a flowchart showing a division channel matrix generation process in accordance with the first embodiment of this invention.

FIG. 4 is a flowchart of a division channel matrix generation process according to the first embodiment of this invention.

The division channel matrix generation process is performed after the channel matrix is generated in the step 302 of FIG. 3.

First, the matrix division process unit 23 sets a signal division number (401). Specifically, the matrix division process unit 23 receives information on a signal division number determined by the division control unit 28 and sets the received information as the signal division number.

Next, the matrix division process unit 23 divides the channel matrix generated by the channel matrix generation unit 22 into sub-matrices corresponding to the signal division number set in the step 401 (402). For example, when the signal division number is set to two, both of rows and columns of the channel matrix are divided into two to obtain four sub-matrices. Further, when the signal division number is set to three, nine sub-matrices are obtained.

Next, the matrix division process unit 23 obtains the inverse matrices of the sub-matrices obtained through the division in the step 402 or obtains the generalized inverse matrix by using the formula (12) (403). The inverse matrix calculation in the right side of the formula (12) can be performed by a numeric calculation through typical LU decomposition, for instance.

Next, the matrix division process unit 23 uses the sub-matrices obtained through the division in the step 402 and the (generalized) inverse matrices obtained in the step 403 to perform calculations in the round brackets in the right sides of the formulae (10) and (11), thereby generating division channel matrices (404). The division channel matrix generation process ends.

Figure 5:
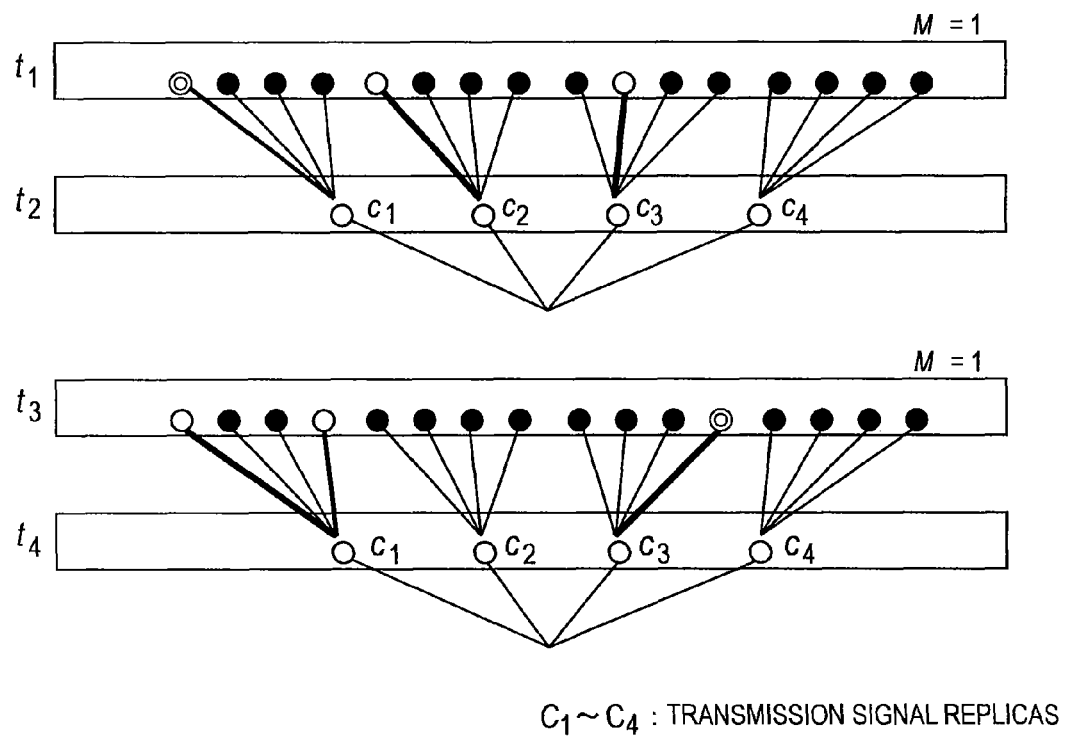
FIG. 5 is an explanatory diagram showing an operation example of the MLD process units in accordance with the first embodiment of this invention.

FIG. 5 shows an operation example of the MLD process units 26 according to the first embodiment of this invention.

Figure 11:
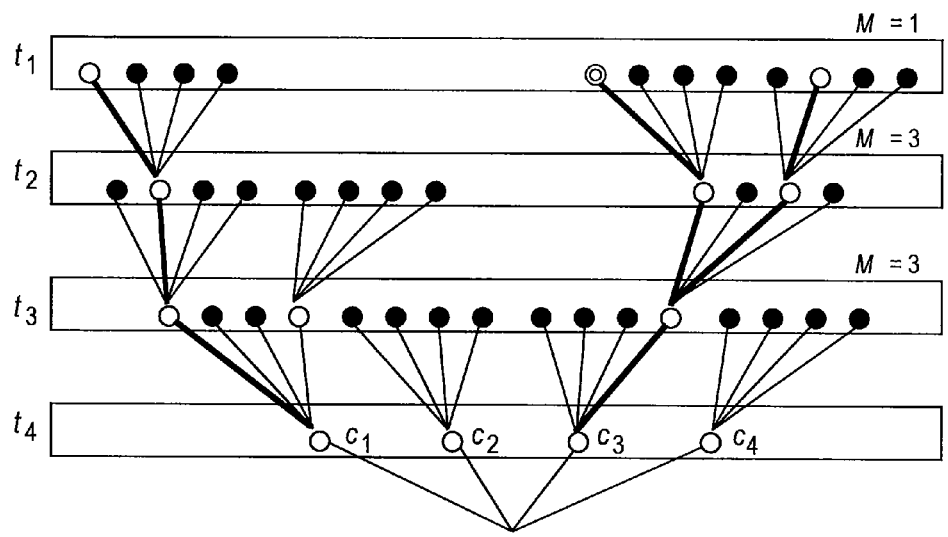
FIG. 11 is an explanatory diagram showing an operation of a process of a conventional M-algorithm.

Unlike a conventional M-algorithm operation example shown in FIG. 11, the transmitted signals ($t_1$, $t_2$) and ($t_3$, $t_4$) are independently determined through the MLD process according to the first embodiment. When the transmitted signals ($t_1$, $t_2$) and ($t_3$, $t_4$) are independently determined, the depth of a tree hierarchy is reduced (to a half in the example shown in FIG. 5) to reduce the entire computational complexity.

Second Embodiment

In a second embodiment of this invention, multiple transmitted-signal estimation solutions are obtained in the first embodiment by applying the MLD process to the sub-matrices, and, in order to improve the quality of a solution, an integrated MLD process is performed by combining the obtained multiple transmitted-signal estimation solutions.

Figure 6:
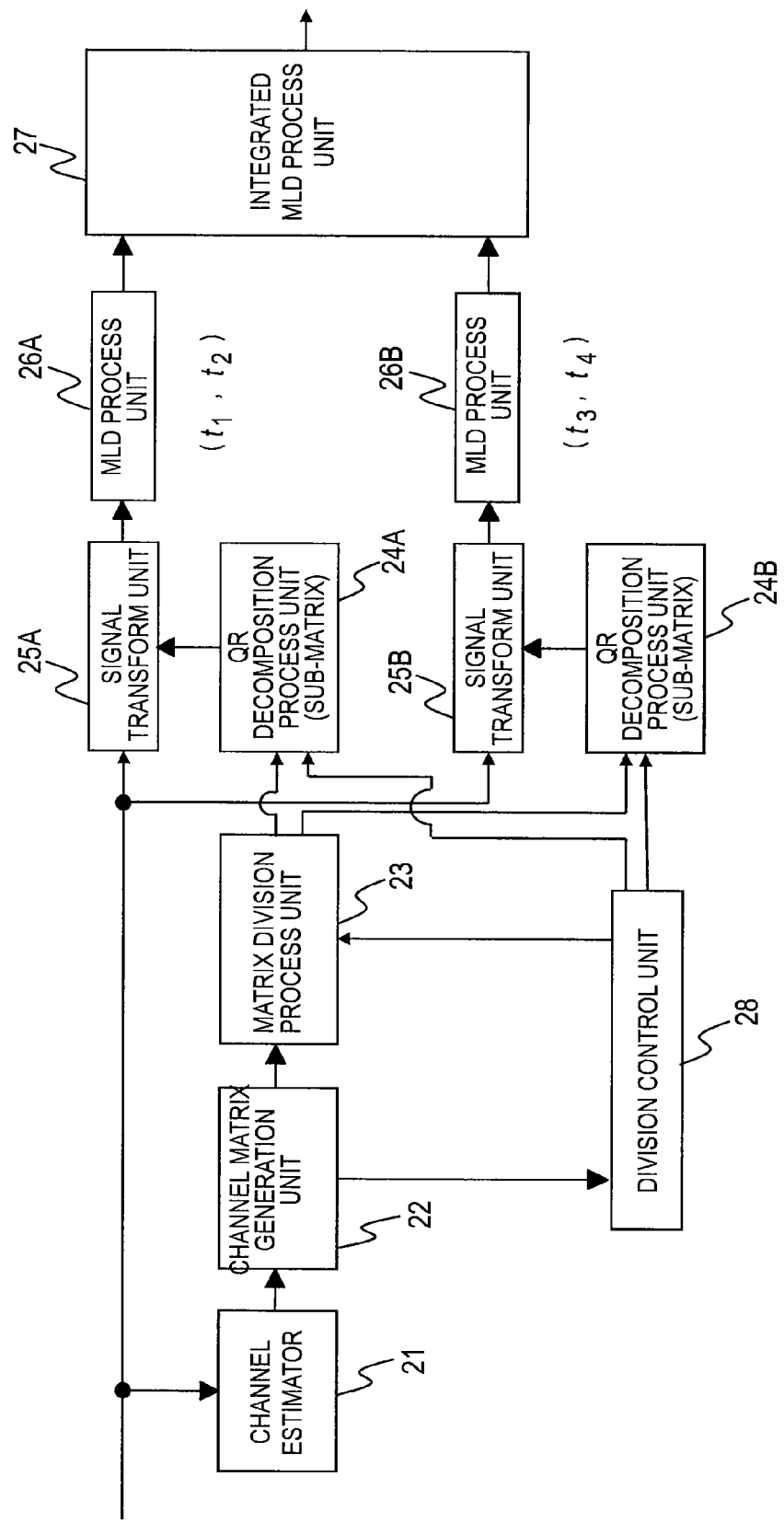
FIG. 6 is a block diagram showing a configuration of a QRM-MLD process unit in accordance with a second embodiment of this invention.

FIG. 6 is a configuration diagram of a QRM-MLD process unit 8 according to the second embodiment of this invention.

In the second embodiment, unlike in the first embodiment, the QRM-MLD process unit 8 includes an integrated MLD process unit 27 at a subsequent stage of the MLD process units 26.

The integrated MLD process unit 27 performs an integrated MLD process by combining transmitted-signal estimation solutions obtained by the MLD process units 26.

Figure 7:
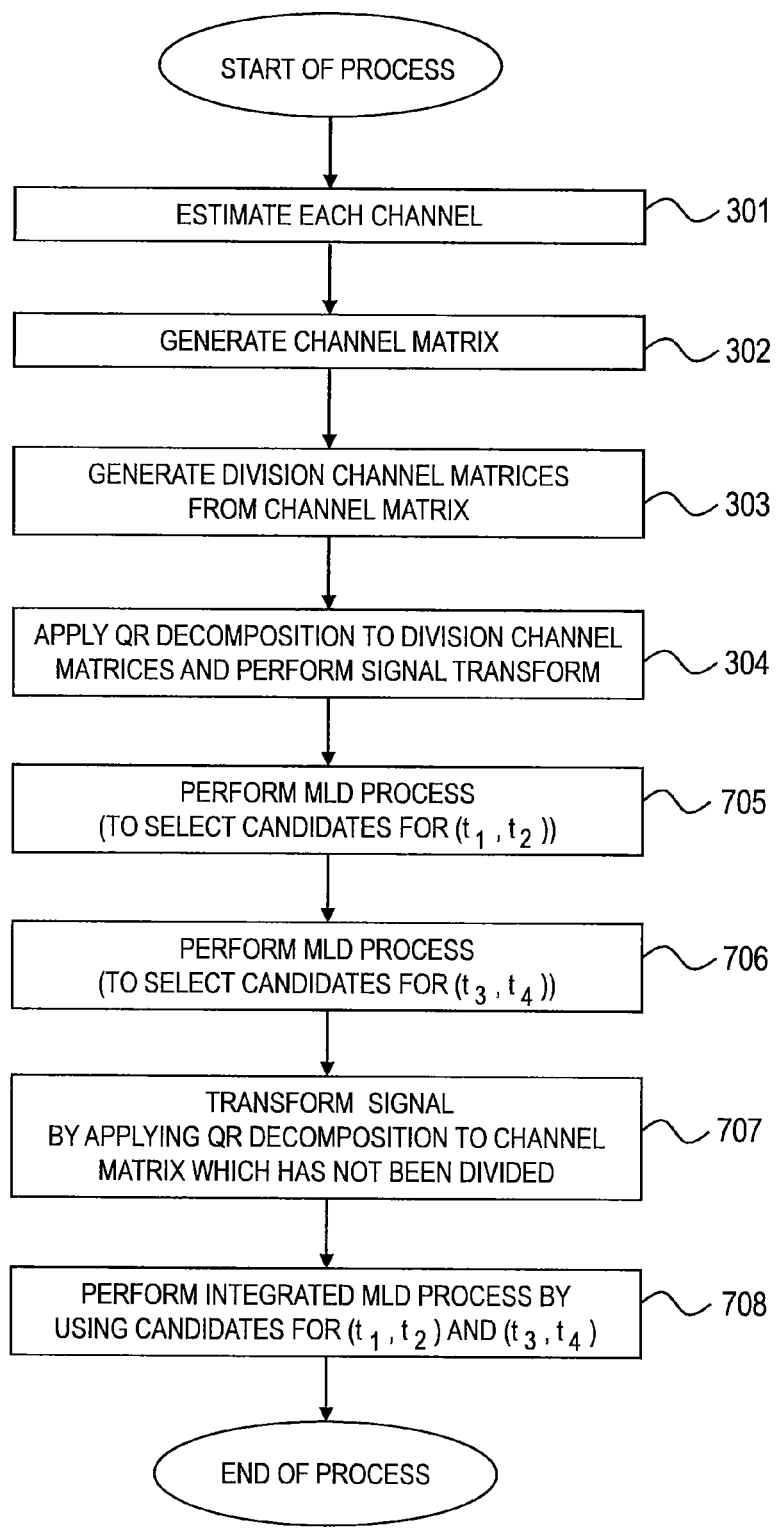
FIG. 7 is a flowchart showing a division QRM-MLD process in accordance with the first embodiment of this invention.

FIG. 7 is a flowchart of a division QRM-MLD process according to the second embodiment of this invention.

Steps 301 to 304 correspond to the steps 301 to 304 shown in FIG. 3, and hence descriptions thereof are omitted.

The MLD process unit 26A applies the MLD process to a sub-matrix including the transmitted signals ($t_1$, $t_2$) and selects multiple candidates for the transmitted signals ($t_1$, $t_2$) (705).

Next, the MLD process unit 26B applies the MLD process to another sub-matrix including the transmitted signals ($t_3$, $t_4$) and selects multiple candidates for the transmitted signals ($t_3$, $t_4$) in the same manner (706).

Next, the integrated MLD process unit 27 applies QR decomposition to the channel matrix generated in the step 302 and transforms the received signals into new signals based on a result of the QR decomposition (707).

Next, the integrated MLD process unit 27 performs an integrated MLD process for the new signals obtained through the signal transform in the step 707, by using the multiple combination candidates for the transmitted signals ($t_1$, $t_2$) selected in the step 705 and the multiple combination candidates for the transmitted signals ($t_3$, $t_4$) selected in the step 706. Then, the integrated MLD process unit 27 determines the transmitted signals ($t_1$, $t_2$, $t_3$, $t_4$) based on results of the integrated MLD process.

Specifically, the integrated MLD process unit 27 calculates Euclidean distances between the multiple combination candidates for the transmitted signals ($t_1$, $t_2$) selected in the step 705 and the multiple combination candidates for the transmitted signals ($t_3$, $t_4$) selected in the step 706, and determines candidates for the transmitted signals ($t_1$, $t_2$, $t_3$, $t_4$) whose integrated Euclidean distance is shortest, as estimation values.

Figure 8:
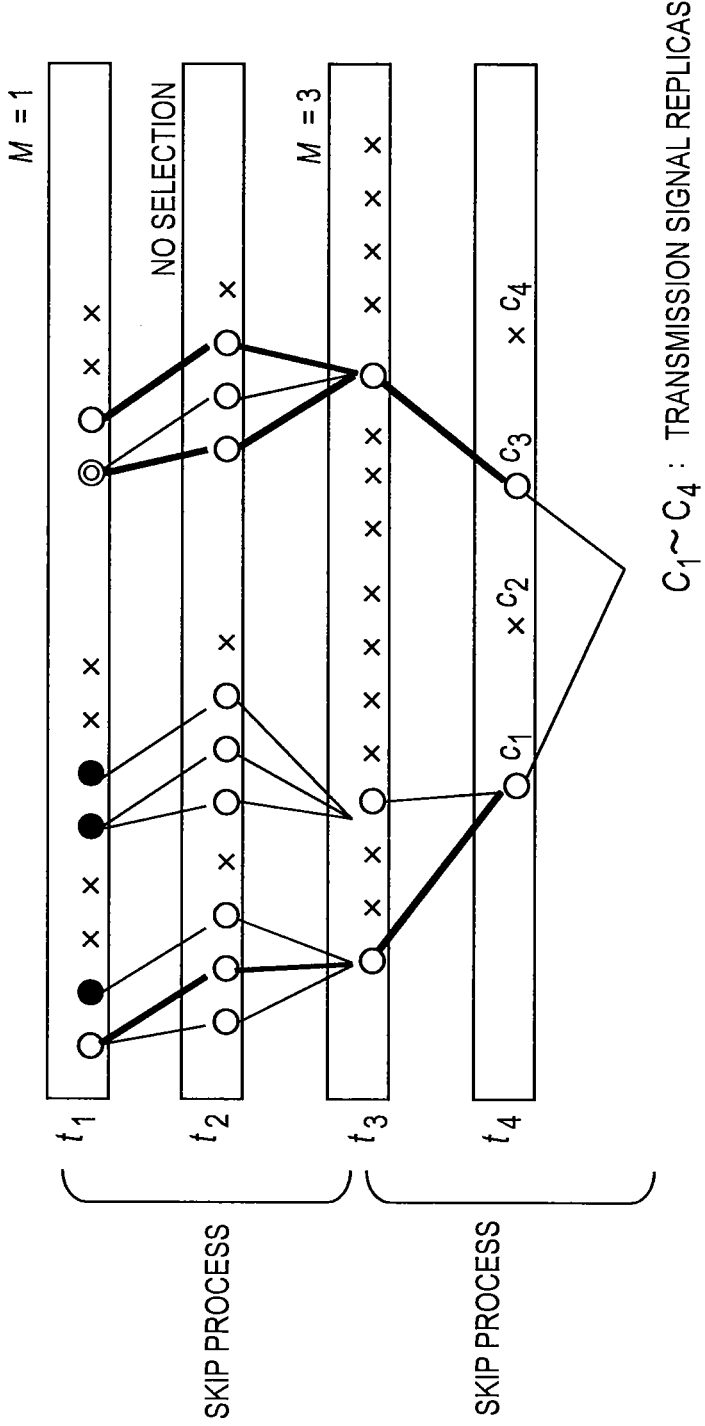
FIG. 8 is an explanatory diagram showing an operation example of an integrated MLD process unit in accordance with the second embodiment of this invention.
Figure 10:
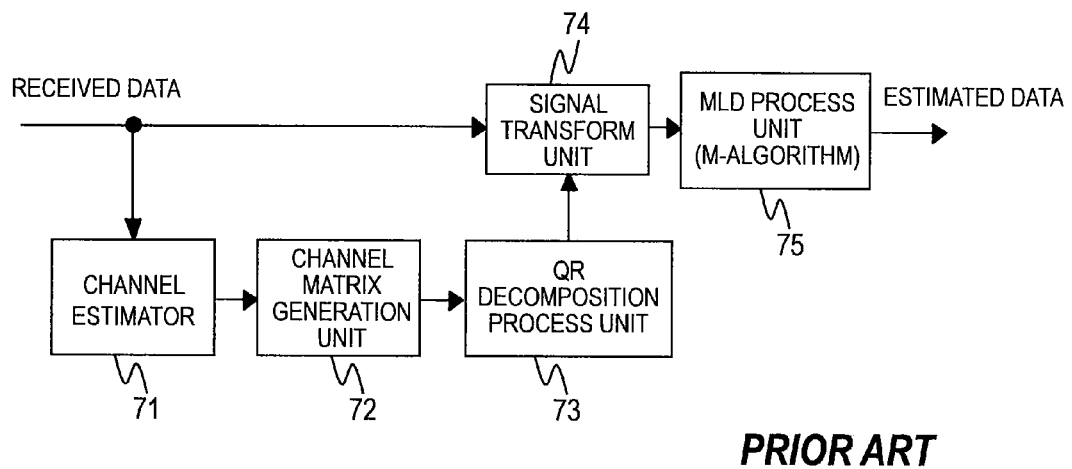
FIG. 10 is a block diagram showing a configuration of a QRM-MLD process unit that executes the conventional QRM-MLD process.

FIG. 8 shows an operation example of the integrated MLD process unit 27 according to the second embodiment of this invention.

For the transmitted signals ($t_3$, $t_4$), the MLD process is skipped because candidates estimated in advance are used therefor. Further, since candidates for the transmitted signals ($t_1$, $t_2$) are also estimated, the MLD process is performed only to combine the transmitted signals ($t_1$, $t_2$) and ($t_3$, $t_4$). Therefore, the computational complexity is reduced compared with a case where symbol replicas are generated for all transmitted signals and the MLD process is performed anew. Since the integrated MLD process is performed at the last stage unlike in the first embodiment, effects of all transmitted signals are taken into account, thereby improving the quality of transmitted-signal estimation solutions.

FIG. 9 is an explanatory diagram showing a comparison of the computational complexity between the first and second embodiments of this invention and a conventional technology.

When 16 QAM is used as a modulation and demodulation system, and the number of transmitted-signal candidates to be selected is 16, complex multiplier numbers are compared between a case where 4×4 transmitter and receiver antennas (four transmitter antennas and four receiver antennas) are used and a case where 6×6 transmitter and receiver antennas (six transmitter antennas and six receiver antennas) are used.

Processes to be considered in comparing the complex multiplier numbers include QR decomposition, generation of symbol replicas of transmitted signals, and calculation of squared Euclidean distances. In a case of N transmitter antennas, C levels of modulation and demodulation, S candidates to be selected, and a signal division number of G, the complex multiplier number needs to be the computational complexity of about N cubic in QR decomposition. Further, the computational complexity of $C+SC(N/G-1)(N/G+2)/2$ is required in generating symbol replicas. Further, the computational complexity of C+SC(N/G−1) is required in calculating squared Euclidean distances. Further, the computational complexity of {(10/G)N^3−13GN}/3 is required in generating division matrices.

With the conventional technology, 3,253 calculations are performed for 4×4 transmitter and receiver antennas, and 6,862 calculations are performed for 6×6 transmitter and receiver antennas. The computational complexity increases by approximately the square of the number of transmitter and receiver antennas.

On the other hand, in the first embodiment of this invention, when the signal division number is set to two to obtain four sub-matrices, 1,752 calculations are performed for 4×4 transmitter and receiver antennas, and 4,206 calculations are performed for 6×6 transmitter and receiver antennas. It is found that the computational complexity is reduced (by 39% to 45%) compared with the conventional technology. Further, when the signal division number is set to three to obtain nine sub-matrices, 2,706 calculations are performed for 6×6 transmitter and receiver antennas. The computational complexity is further reduced (by 61%).

Moreover, in the second embodiment of this invention, the integrated MLD process is additionally performed, and hence the computational complexity is increased compared with the first embodiment. However, the computational complexity is reduced compared with the conventional technology. Specifically, when the signal division number is set to two, 2,040 calculations (reduced by 42%) are performed for 4×4 transmitter and receiver antennas, and 4,520 calculations (reduced by 34%) are performed for 6×6 transmitter and receiver antennas. Further, when the signal division number is set to three, 3,282 calculations (reduced by 52%) are performed for 6×6 transmitter and receiver antennas.

While the present invention has been described in detail and pictorially in the accompanying drawings, the present invention is not limited to such detail but covers various obvious modifications and equivalent arrangements, which fall within the purview of the appended claims.

What is claimed is:

1. A maximum likelihood decoding method of separating and estimating multiple transmitted signals transmitted by multiple transmitter antennas from multiple received signals received by multiple receiver antennas, comprising:

a first step of generating a channel matrix based on channel impulse responses corresponding to the received signals;

a second step of dividing the generated channel matrix H, into multiple sub-matrices $h_{ij}$, in which the generated channel matrix H is defined as:

$$H = \begin{bmatrix} h_{11} & h_{12} & h_{13} & h_{14} \\ h_{21} & h_{22} & h_{23} & h_{24} \\ h_{31} & h_{32} & h_{33} & h_{34} \\ h_{41} & h_{42} & h_{43} & h_{44} \end{bmatrix}$$

and, in which said sub-matrices $h_{ij}$ each have a same size and are defined as:

$$H_{11} = \begin{bmatrix} h_{11} & h_{12} \\ h_{21} & h_{22} \end{bmatrix}$$

-continued
$$H_{12} = \begin{bmatrix} h_{13} & h_{14} \\ h_{23} & h_{24} \end{bmatrix} H_{21} = \begin{bmatrix} h_{31} & h_{32} \\ h_{41} & h_{42} \end{bmatrix} \text{ and } H_{22} = \begin{bmatrix} h_{33} & h_{34} \\ h_{43} & h_{44} \end{bmatrix}.$$

in which said sub-matrices are comprised of identifying parts of the received signals corresponding to the sub-matrices obtained through the division, and of transforming the sub-matrices, obtained through the division, by using inverse matrices of the sub-matrices obtained through the division;

after said second step, a third step of transforming the received signal parts using said sub-matrices; and a fourth step of selecting at least one combination candidate for parts of the transmitted signals corresponding to the transformed received signals, and determining one combination candidate for each of the parts of the transmitted signals so that the determined combination candidate has a shortest Euclidean distance, wherein the sub-matrices collectively represent all received signals as follows:

$$\begin{bmatrix} r_1 \\ r_2 \end{bmatrix} = H_{11} \begin{bmatrix} t_1 \\ t_2 \end{bmatrix} + H_{12} \begin{bmatrix} t_3 \\ t_4 \end{bmatrix} \text{ and } \begin{bmatrix} r_3 \\ r_4 \end{bmatrix} = H_{21} \begin{bmatrix} t_1 \\ t_2 \end{bmatrix} + H_{22} \begin{bmatrix} t_3 \\ t_4 \end{bmatrix},$$

wherein each partial transmitted signal is calculated based on all received signals, where $t_1$-$t_4$ are transmitted signals and $r_1$-$r_4$ are reception signals.

2. The maximum likelihood decoding method according to claim 1, wherein the inverse matrices used in the second step are calculated after noise components are added to diagonal elements in the sub-matrices obtained through the division.

3. The maximum likelihood decoding method according to claim 1, wherein, in the second step, the generated channel matrix is divided into multiple sub-matrices by dividing rows and columns of the generated channel matrix by a common factor of the number of the rows and the number of the columns of the generated channel matrix.

4. The maximum likelihood decoding method according to claim 1, wherein, in the second step, the generated channel matrix is divided so as to obtain the largest number of sub-matrices.

5. A maximum likelihood decoding (MLD) equipment which separates and estimates multiple transmitted signals transmitted by multiple transmitter antennas from multiple received signals received by multiple receiver antennas, comprising:

a channel matrix generation unit for generating a channel matrix from channel impulse responses corresponding to the received signals;

a matrix division process unit for dividing the generated channel matrix H into multiple sub-matrices $h_{ij}$, in which the generated channel matrix H is defined as:

$$H = \begin{bmatrix} h_{11} & h_{12} & h_{13} & h_{14} \\ h_{21} & h_{22} & h_{23} & h_{24} \\ h_{31} & h_{32} & h_{33} & h_{34} \\ h_{41} & h_{42} & h_{43} & h_{44} \end{bmatrix}$$

and, in which said sub-matrices $h_{ij}$ each have a same size and are defined as:

$$H_{11} = \begin{bmatrix} h_{11} & h_{12} \\ h_{21} & h_{22} \end{bmatrix}$$

$$H_{12} = \begin{bmatrix} h_{13} & h_{14} \\ h_{23} & h_{24} \end{bmatrix} \quad H_{21} = \begin{bmatrix} h_{31} & h_{32} \\ h_{41} & h_{42} \end{bmatrix} \text{ and } H_{22} = \begin{bmatrix} h_{33} & h_{34} \\ h_{43} & h_{44} \end{bmatrix}.$$

in which said sub-matrices specify parts of the received signals corresponding to the sub-matrices obtained through the division, and transforming the sub-matrices, obtained through the division, by using inverse matrices of the sub-matrices obtained through the division;

a signal transform unit for transforming the received signal parts; and an MLD process unit for determining one combination candidate for each part of the transmitted signals corresponding to the transformed received signals, wherein the sub-matrices collectively represent all received signals as follows:

$$\begin{bmatrix} r_1 \\ r_2 \end{bmatrix} = H_{11} \begin{bmatrix} t_1 \\ t_2 \end{bmatrix} + H_{12} \begin{bmatrix} t_3 \\ t_4 \end{bmatrix} \text{ and } \begin{bmatrix} r_3 \\ r_4 \end{bmatrix} = H_{21} \begin{bmatrix} t_1 \\ t_2 \end{bmatrix} + H_{22} \begin{bmatrix} t_3 \\ t_4 \end{bmatrix},$$

wherein each partial transmitted signal is calculated based on all received signals, where $t_1$-$t_4$ are transmitted signals and $r_1$-$r_4$ are reception signals.

6. The maximum likelihood decoding equipment according to claim 5, further comprising a division control unit for determining, based on the generated channel matrix, a division number for the channel matrix, and instructing the matrix division process unit to divide the channel matrix based on the determined division number.

7. The maximum likelihood decoding equipment according to claim 5, wherein the MLD process unit is configured to:
select at least one combination candidate for the parts of the transmitted signals corresponding to the transformed received signals; and
determined one combination candidate for the parts so that the determined one combination candidate has a shortest Euclidean distance.

8. The maximum likelihood decoding equipment according to claim 5, wherein the inverse matrices used in the matrix division process unit are calculated after noise components are added to diagonal elements in the sub-matrices obtained through the division.

9. The maximum likelihood decoding equipment according to claim 5, wherein the matrix division process unit divides the generated channel matrix into multiple sub-matrices by dividing rows and columns of the generated channel matrix by a common factor of the number of the rows and the number of the columns of the generated channel matrix.

10. The maximum likelihood decoding equipment according to claim 5, wherein the matrix division process unit divides the generated channel matrix so as to obtain the largest number of sub-matrices.

11. A receiver, comprising: multiple receiver antennas for receiving multiple transmitted signals transmitted by multiple transmitter antennas;
an RF reception circuit unit for amplifying the received signals received by the receiver antennas; and
a baseband signal processing unit for decoding the amplified received signals,
wherein the baseband signal processing unit comprises:
maximum likelihood decoding (MLD) equipment for separating and estimating the multiple transmitted signals transmitted by the multiple transmitter antennas from the amplified received signals;
a calculation unit for calculating log likelihood ratios of the multiple transmitted signals obtained through the separation; and
a decoding unit for decoding the multiple transmitted signals obtained through the separation, based on the calculated log likelihood ratios, and
wherein the maximum likelihood decoding equipment comprises:
a channel matrix generation unit for generating a channel matrix from channel impulse responses corresponding to the received signals;
a matrix division process unit for dividing the generated channel matrix H into multiple sub-matrices $h_{ij}$, in which the generated channel matrix H is defined as:

$$H = \begin{bmatrix} h_{11} & h_{12} & h_{13} & h_{14} \\ h_{21} & h_{22} & h_{23} & h_{24} \\ h_{31} & h_{32} & h_{33} & h_{34} \\ h_{41} & h_{42} & h_{43} & h_{44} \end{bmatrix}$$

and, in which said sub-matrices $h_{ij}$ each have a same size and are defined as:

$$H_{11} = \begin{bmatrix} h_{11} & h_{12} \\ h_{21} & h_{22} \end{bmatrix}$$

$$H_{12} = \begin{bmatrix} h_{13} & h_{14} \\ h_{23} & h_{24} \end{bmatrix} \quad H_{21} = \begin{bmatrix} h_{31} & h_{32} \\ h_{41} & h_{42} \end{bmatrix} \text{ and } H_{22} = \begin{bmatrix} h_{33} & h_{34} \\ h_{43} & h_{44} \end{bmatrix}.$$

in which said sub-matrices specify parts of the received signals corresponding to the sub-matrices obtained through the division, and transforming the sub-matrices, obtained through the division, by using inverse matrices of the sub-matrices obtained through the division;

a signal transform unit for transforming the received signal parts; and an MLD process unit for determining one combination candidate for parts of the transmitted signals corresponding to the transformed received signals, wherein the sub-matrices collectively represent all received signals as follows:

$$\begin{bmatrix} r_1 \\ r_2 \end{bmatrix} = H_{11} \begin{bmatrix} t_1 \\ t_2 \end{bmatrix} + H_{12} \begin{bmatrix} t_3 \\ t_4 \end{bmatrix} \text{ and } \begin{bmatrix} r_3 \\ r_4 \end{bmatrix} = H_{21} \begin{bmatrix} t_1 \\ t_2 \end{bmatrix} + H_{22} \begin{bmatrix} t_3 \\ t_4 \end{bmatrix},$$

wherein each partial transmitted signal is calculated based on all received signals, where $t_1$-$t_4$ are transmitted signals and $r_1$-$r_4$ are reception signals.

12. The receiver according to claim 11, wherein the maximum likelihood decoding equipment further comprises a division control unit for determining, based on the generated channel matrix, a division number for the channel matrix, and instructing the matrix division process unit to divide the channel matrix based on the determined division number.

13. The receiver according to claim 11, wherein the MLD process unit is configured to:
select at least one combination candidate for the parts of the transmitted signals corresponding to the transformed received signals; and determine one combination candidate for each of the parts so that the determined combination candidate has the shortest Euclidean distance.

14. The receiver according to claim 11, wherein the inverse matrices used in the matrix division process unit are calculated after noise components are added to diagonal elements in the sub-matrices obtained through the division.

15. The receiver according to claim 11, wherein the matrix division process unit divides the generated channel matrix into multiple sub-matrices by dividing rows and columns of the generated channel matrix by a common factor of the number of the rows and the number of the columns of the generated channel matrix.

16. The receiver according to claim 11, wherein the matrix division process unit divides the generated channel matrix so as to obtain the largest number of sub-matrices.

\* \* \* \* \*